(12) United States Patent
Parr

(10) Patent No.: US 6,374,096 B1
(45) Date of Patent: Apr. 16, 2002

(54) SYSTEM AND METHOD FOR DETECTING INTERFERENCE PRESENT IN MOBILE SATELLITE COMMUNICATION LINKS BASED ON NOISE FLOOR POWER LEVELS OF SATELLITE COMMUNICATION LINKS

(75) Inventor: Michael Parr, Hermosa Beach, CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/323,319

(22) Filed: Jun. 1, 1999

Related U.S. Application Data
(60) Provisional application No. 60/108,859, filed on Nov. 17, 1998.

(51) Int. Cl.[7] ............................................... H04B 17/00
(52) U.S. Cl. ...................... 455/226.1; 455/63; 455/423; 455/12.1; 342/359
(58) Field of Search ............................... 455/12.1, 67.1, 455/67.3, 63, 67.4, 501, 10, 423, 226.1, 226.3, 9; 342/359, 159, 196

(56) References Cited

U.S. PATENT DOCUMENTS

| | | | |
|---|---|---|---|
| 4,119,964 A | * | 10/1978 | Johannsen et al. ......... 343/17.1 |
| 5,241,565 A | * | 8/1993 | Kloc et al. .................... 375/58 |
| 5,280,288 A | * | 1/1994 | Sherry et al. .................. 342/83 |
| 5,722,082 A | * | 2/1998 | Schloemer .................. 455/509 |
| 5,933,111 A | * | 8/1999 | Schroeder et al. .......... 342/359 |
| 6,097,957 A | * | 8/2000 | Bonta et al. ................. 455/446 |

* cited by examiner

Primary Examiner—William Trost
Assistant Examiner—Tilahun Gesesse
(74) Attorney, Agent, or Firm—John T. Whelan; Michael W. Sales

(57) ABSTRACT

A method, and related apparatus, for detecting interference at a first communications terminal comprising establishing a communications link between the first communications terminal and a second communications terminal. Then monitoring a noise floor of the communications link over time, the noise floor representing a base level of noise present in the communications link and calculating a long term noise floor power level without interference in response to the monitoring of the noise floor of the communications link over time. Then monitoring a noise floor of a current communication through the communications link, representing a current level of noise present on the communications link and calculating a short term noise floor power level in response to the monitoring of the noise floor of the current communication through the communications link. Finally, comparing the short-term noise floor power level with the long term noise floor power level without interference.

16 Claims, 12 Drawing Sheets

DETERMINE THE SHORT TERM NOISE FLOOR
POWER LEVEL OF CURRENT COMMUNICATION.
CAL_M_ST

INTERFERENCE DETECTION SYSTEM

CALIBRATION WITH AND WITHOUT LOW LEVEL INTERFERENCE

STANDARD DEVIATION OF CALIBRATION ESTIMATES

STANDARD DEVIATION DURING HIGH LEVEL INTERFERENCE

CALIBRATION DURING SPORADIC INTERFERENCE

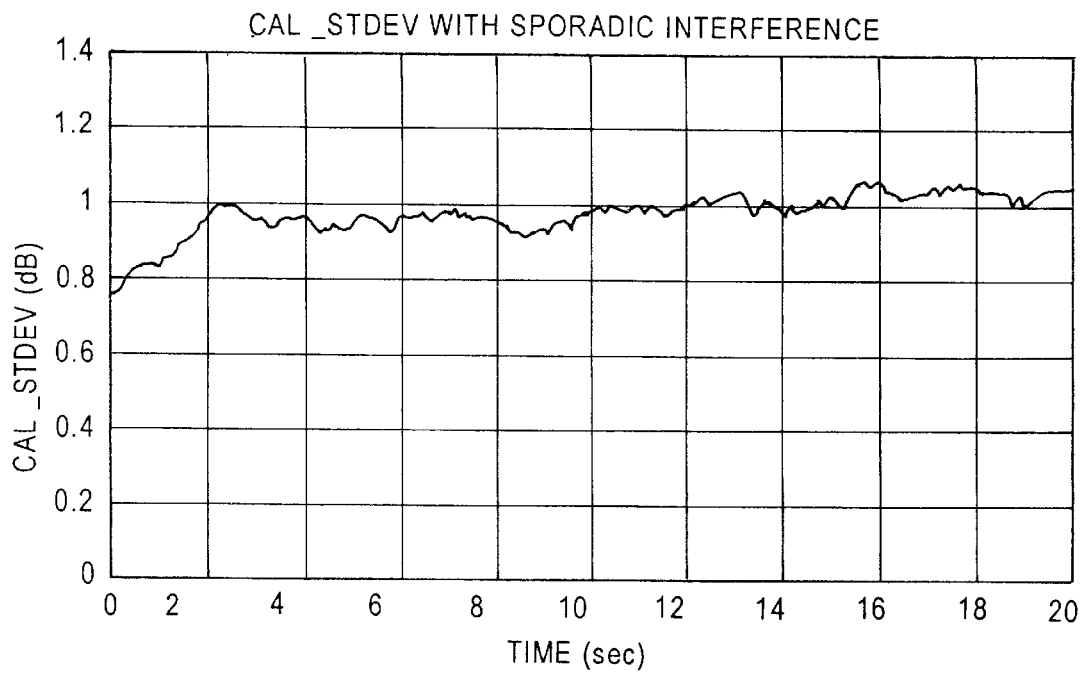
FIG. 16  STANDARD DEVIATION OF CALIBRATION DURING SPORADIC INTERFERENCE
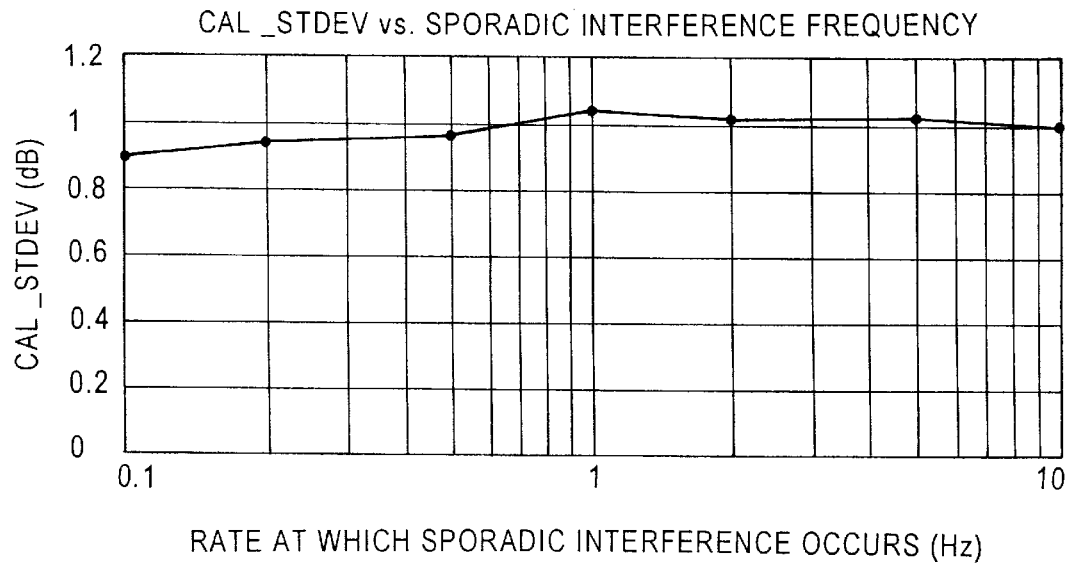
FIG. 17  SENSITIVITY TO FREQUENCY OF PRESENCE OF SPORADIC INTERFERENCE

SYSTEM AND METHOD FOR DETECTING INTERFERENCE PRESENT IN MOBILE SATELLITE COMMUNICATION LINKS BASED ON NOISE FLOOR POWER LEVELS OF SATELLITE COMMUNICATION LINKS

RELATED APPLICATIONS

This application is based on and claims benefit from provisional application entitled "Interference Detection in Mobile Satellite Communications Links" which was filed on Nov. 17, 1998, and respectively accorded Application No. 60/108,859.

BACKGROUND OF THE INVENTION

The present invention relates to communications systems, and more particularly to mobile satellite communications. Even more particularly, the present invention relates to interference detection in a mobile satellite communications system.

Interference presents a challenging constraint in the operation of satellite systems. Nearby satellites, terrestrial radio transmitters, and microwave sources produce signals that can substantially degrade or disrupt a desired signal in the satellite communications system. These signals may be intentionally designed to interfere with the desired signal, or may be inadvertent. In any case, it is important to quickly detect interference so that the source can be removed, or satellite communications system users moved to other resources.

Traditionally, interference is detected by observing anomalous behavior in the satellite communications system over an extended period of time. By observing anomalous behavior, and by combining these observations with knowledge of possible sources of interference, conclusions are drawn as to the presence of interference. Because, however, traditional methods of detecting interference require observing the communications system over an extended period of time, response to an interference is unacceptably slow. Additionally, using traditional methods, the specific characteristics of the interference are difficult to determine absent a priori knowledge of possible sources of interference, thus making determination of the likely source(s) of the interference more difficult.

SUMMARY OF THE INVENTION

The present invention advantageously addresses the needs above as well as other needs by providing a method, and related apparatus, for quickly and precisely detecting an interference in a communication system, in particular in a mobile satellite communication system.

In one embodiment, the invention can be characterized as a method of detecting interference at a first communications terminal comprising establishing a communications link between the first communications terminal and a second communications terminal. Then monitoring a noise floor of the communications link over time, the noise floor representing a base level of noise present in the communications link, and calculating a long term noise floor power level without interference in response to the monitoring of the noise floor of the communications link over time. Then monitoring a noise floor of a current communication through the communications link, this noise floor representing a current level of noise present on the communications link, and calculating a short term noise floor power level in response to the monitoring of the noise floor of the current communication through the communications link, subsequently, comparing the short term noise floor power level with the long term noise floor power level.

In another embodiment, the invention can be characterized as a method of estimating a noise floor power level of a communications link, including receiving a plurality of bursts from the communications link into a communications terminal. Then, generating an error vector magnitude from each of the plurality of bursts and generating a received signal strength indication from each of the plurality of bursts. Then, linearizing the error vector magnitude and the received signal strength indication from each of the plurality of bursts and defining a sample as the difference between the received signal strength indication and the error vector magnitude from each of the plurality of bursts. Finally, averaging a plurality of samples taken over a period of time.

In a further embodiment, the invention can be characterized as a communications system for detecting interference including a first communications terminal for transmitting and receiving signals to and from a second communications terminal and a communications link established between the first communications terminal and the second communications terminal. Also, an interference detector coupled to the first communications terminal, the interference detector including: means for generating a long term noise floor power level of the communications link without interference, means for generating a short term noise floor power level of a current communication using the communications link, and means for comparing the long term noise floor power level and the short term noise floor power level.

BRIEF DESCRIPTION OF THE DRAWINGS

The above and other aspects, features and advantages of the present invention will be more apparent from the following more particular description thereof, presented in conjunction with the following drawings wherein:

FIG. 16 is a graph of the standard deviation of the calibration of the mean of FIG. 8 during sporadic interference; and FIG. 17 is a graph showing a relationship between the standard deviation of the calibration of the mean of FIG. 8 and the frequency of a presence of a sporadic interference.

Corresponding reference characters indicate corresponding components throughout the several views of the drawings.

DETAILED DESCRIPTION OF THE PREFERRED EMBODIMENTS

The following description of the presently contemplated best mode of practicing the invention is not to be taken in a limiting sense, but is made merely for the purpose of describing the general principles of the invention. The scope of the invention should be determined with reference to the claims.

Figure 1:
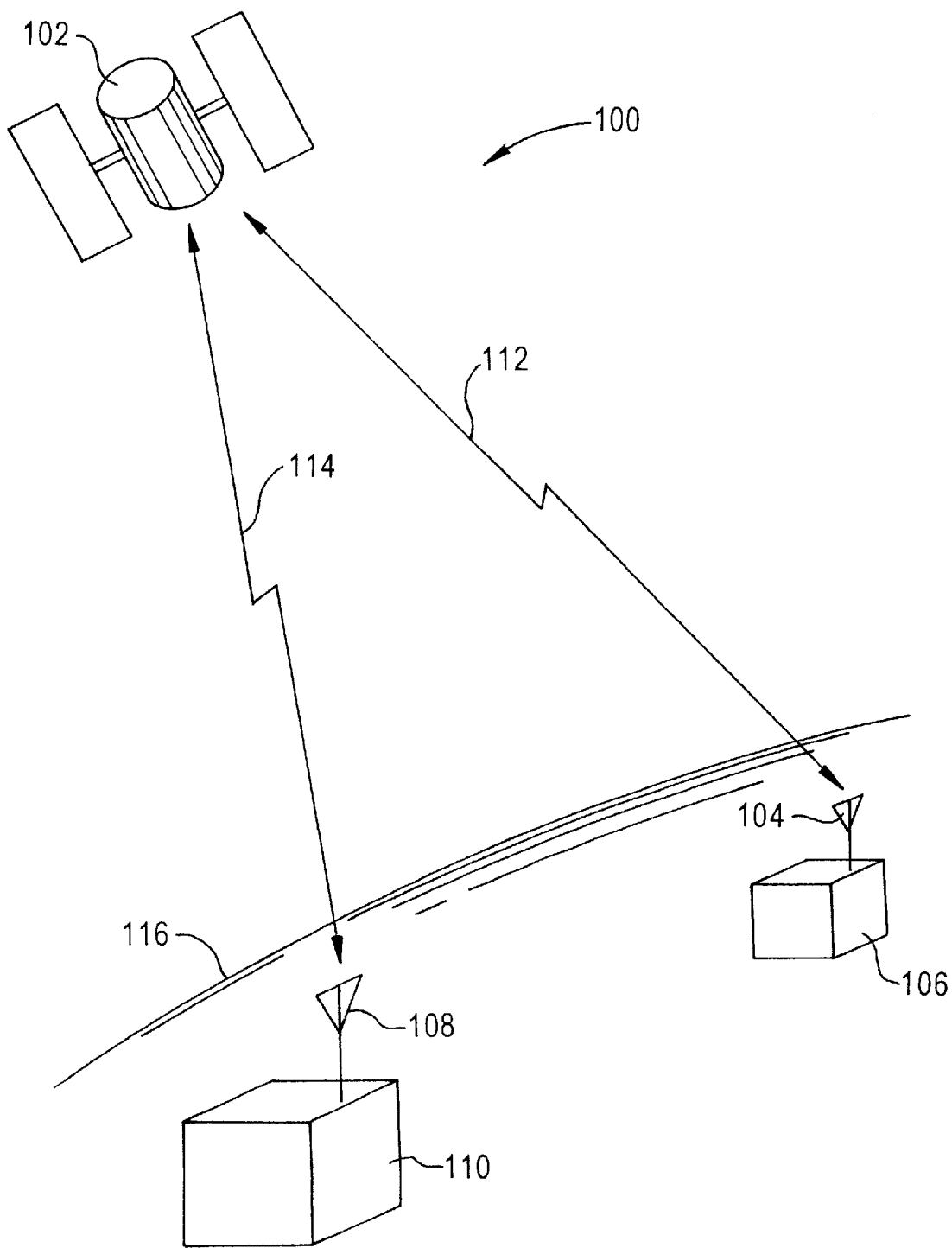
FIG. 1 is a schematic view of a satellite-based mobile communications system in accordance with one embodiment of the present invention.

Referring first to FIG. 1, a schematic view of a satellite-based mobile communications system 100 is shown. A gateway station 110 (or more generically, a communications terminal) on Earth 116 having an antenna 108, a communication terminal 106 having an antenna 104, and a satellite 107 in orbit around the Earth 116 are shown. Also shown are a communications link 114 between the gateway station 110 and the satellite 102 and a communications link 112 between the satellite and the communications terminal 106.

The communications terminal 106 communicates with the gateway station 110 through the communications links 112 and 114 via the satellite 102. The communications links 112 and 114 provide a medium for a variety of channels to pass. The gateway station 110 enables the communications terminal 106 to communicate with other communications terminals (not shown) through other networks, such as a Public Switched Telephone Network (not shown).

Generally, in the interference detection process, the communications terminal 106 monitors the "noise floor" of the communications links 112 and 114 to detect the presence of interference. The "noise floor" represents the level of noise that is constantly present in the communications links 112 and 114. The communications terminal 106 determines the long term noise floor power level without interference by monitoring a broadcast control channel (BCCH) or similar channel using the communications links 112 and 114. The long term noise floor power level determination includes a mechanism to exclude measurements containing interference. Thus, the long term noise floor power level represents the power level of noise without interference in the communications links 112 and 114.

The communications terminal 106 then monitors the noise floor of a current communication using the communications links 112 and 114. Next, the communications terminal 106 determines a short term noise floor power level of the current communication in the communications links 112 and 114. The short term noise floor power level represents the noise floor of a current communication, potentially containing interference, using the communication links 112 and 114.

Finally, the long term noise floor power level and the short term noise floor power level are compared. Assuming a constant level of noise present in the satellite-based communications system 100, the difference represents an interference. Furthermore, the interference is quantified as a measure of power. The variance of the difference between the two noise levels indicates the degree to which the interference is sporadic.

Using the present invention, interference can be detected within seconds of starting a communication using the communications links 112 and 114. Thus, the system 100 can respond quickly to an interference as well as more accurately identify the characteristics of the interference. Since the difference is measured in logarithmic units of power, the detected interference remains unaffected by transmit power levels, shadowing, or fading. The system 100 is able to respond by either removal of the source of interference or by moving the users to other resources, e.g., other satellites or other gateway stations. The interference detection process takes place at the communications terminal 106, but alternatively could take place at the gateway station 110. The details of the interference detection process are discussed below.

Figure 2:
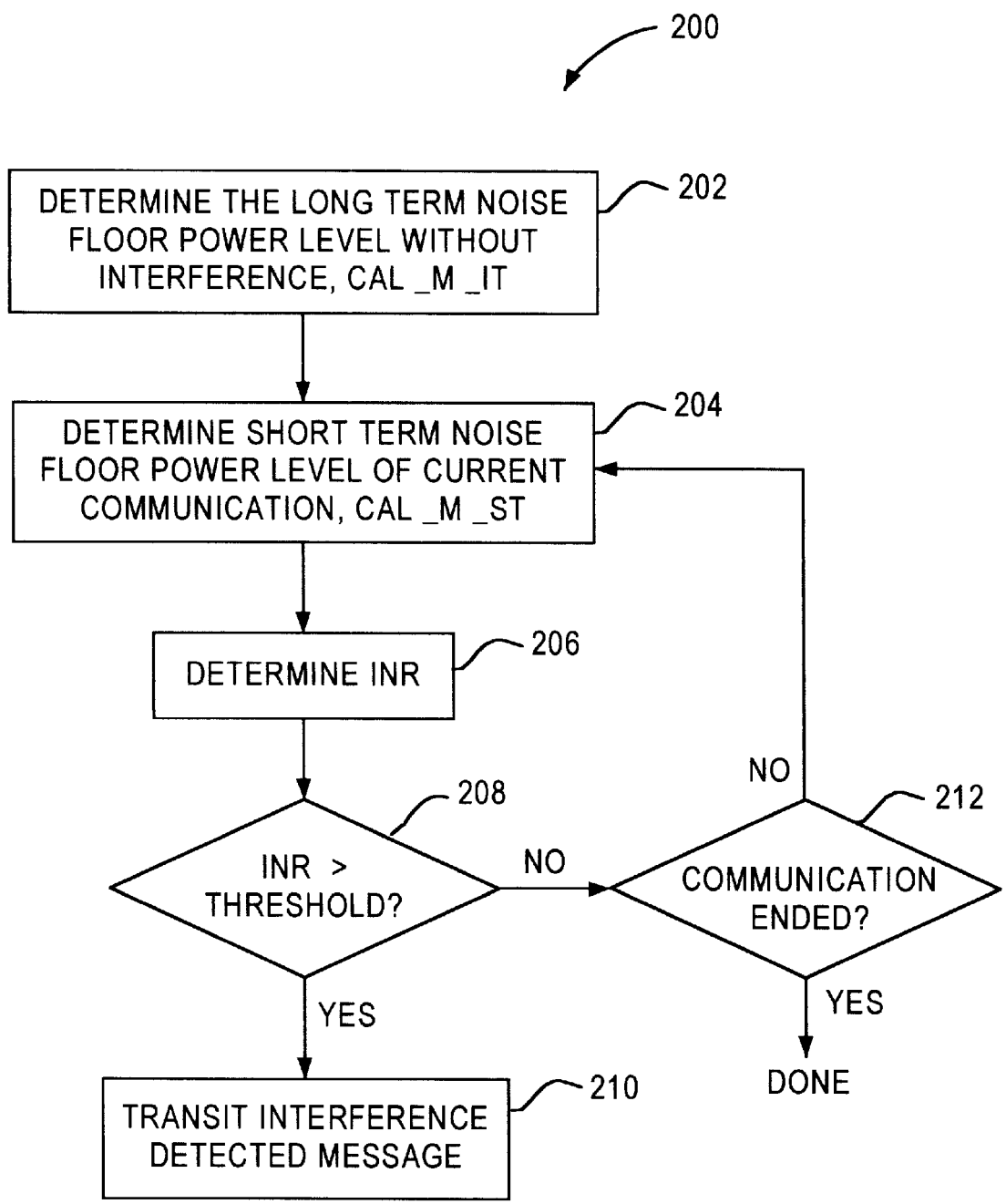
FIG. 2 is a flowchart of a process for detecting interference, such as may be used in the embodiment of FIG. 1.

Referring next to FIG. 2, a flowchart of the process of detecting interference 200 is shown. The first step 202 is to determine the long term noise floor power level, represented by the long term calibration of the mean (CAL_m_lt). Step 202 is shown in detail with reference to FIG. 3. The next step 204 is to determine the short term noise floor power level of a current communication using the communication link represented by the short term current calibration of the mean (CAL_m_st). Step 204 is shown in detail with reference to FIG. 4. Step 206 determines the level of Interference (INR). Then, the INR is compared to a threshold in step 208. If the INR is greater than the threshold, then an interference detected message is transmitted 210. If the INR is less than the threshold, then CAL_m_st is redetermined if the call is still active in accordance with step 212.

Find the Long Term Noise Floor Power Level

Figure 3:
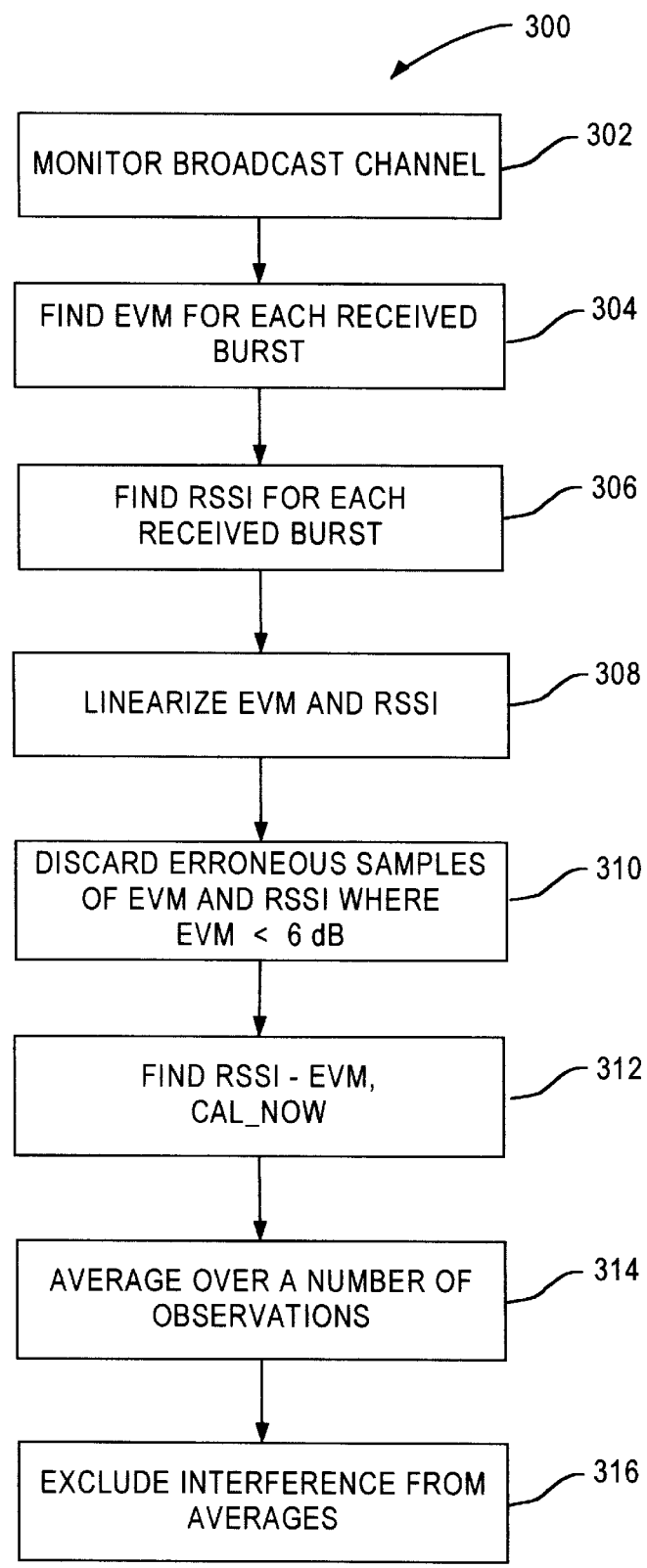
FIG. 3 is a flowchart of a process for generating a long term value of a long term noise floor power level without interference, CAL_m_lt, such as may be used in the mobile communications system of FIG. 1, in combination with the process of FIG. 2.

Referring to FIG. 3, a flowchart 300 is shown for the process of determining the long term base noise floor power level, CAL_m_lt, as is called for in step 202 of FIG. 2. The first step 302 is to monitor a broadcast control channel using the communications link. Next the EVM (measured in dB) is generated for each received burst 304. Step 306 generates the RSSI (measured in dB) for each received burst. Step 308 linearizes the values of EVM and RSSI. Step 310 discards erroneous samples of EVM and RSSI where the EVM is less than 6 dB. Step 312 then takes the difference between the RSSI and EVM. Finally, step 314 averages the differences over a number of observations, and step 316 excludes interference from the averages. The result is CAL_m_lt which is measured in units of dB.

Step 302 monitors a broadcast control channel (BCCH) using the communications link. The communications terminal is typically camped-on for long periods prior to a call thus enabling the monitoring of a broadcast control channel or similar channel. In step 304, as each burst is received, a raw value of the average error vector magnitude (EVM$_a$) over the course of the burst is calculated using the following formula:

$$EVM_a = \sqrt{\frac{1}{N}\sum_{n=0}^{N-1} \sigma^2(n)/\mu^2(n)}$$

where N is the number of demodulated bits in the sample (burst), $\mu$ is the estimated mean level for each demodulated bit, $\sigma^2$ is the estimated variance in level for each demodulated bit. The estimations of the mean level and variance in the level are understood and known within the art. Then the EVM$_a$ over the course of the burst is converted to a power value measured in dB using the following formula:

$$EVM=20*\log_{10}(EVM_a)$$

where EVM is the EVM$_a$ converted to a dB value. For quadrature phase shift keying (QPSK) and similar modulations, the error vector magnitude corresponds to the RMS error in the location of constellation points at the receiver.

Similarly, step 306 determines an estimate of the received signal strength indication by determining the square of the average amplitude of each sample taken over the burst (RSSI$_a$) using the following formula:

$$RSSI_a = \frac{1}{N}\sum_{n=0}^{N-1} \mu^2(n)$$

where N is the number of demodulated bits in the sample (burst), and $\mu$ is the estimated mean level for each demodulated bit. Then the RSSIa is converted to a power value measured in dB using the following formula:

$$RSSI=10*\log_{10}(RSSI_a)+AGC$$

where RSSI is the RSSI$_a$ converted to a dB value, and AGC is the automatic gain control of the receiver. Note that an additional gain term is included to account for automatic gain control of the receiver of the communications terminal to reduce the effects of fading. Including this additional gain term is implementation dependent and needs to be accounted for.

Figure 7:
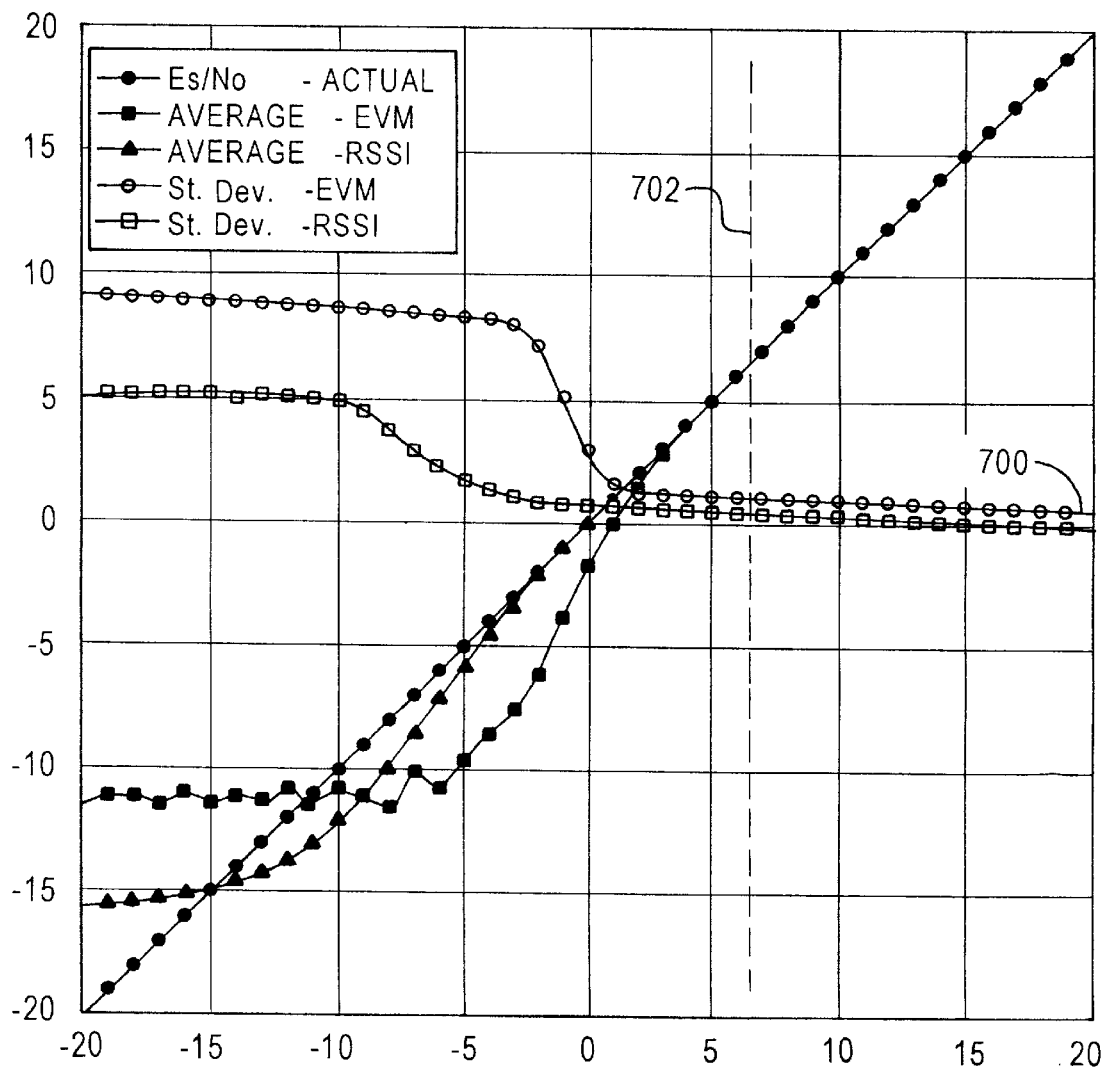
FIG. 7 is a graph of a mean and standard deviation of the estimates of error vector magnitude (EVM) and received signal strength indications (RSSI) such as may be generated by the interference detection system of FIG. 5 as the processes of FIGS. 2, 3 and 4 are carried out over a range of signal to noise ratios.

Step 308 linearizes the values of EVM and RSSI to extend the range of power control effectiveness, for example to extend the EVM and RSSI to respective values between a range of −20 dB to +20 dB actual signal to noise ratios. This is accomplished using a simple look-up based approach. For example, one approach will linearize the EVM and RSSI using 1 dB increments and linear interpolation in between the increments. Such a look-up based approach is known to those skilled in the art. Similarly, the value of the variance of the RSSI and the variance of the EVM are linearized for further use discussed later within the specification. FIG. 7 illustrates graphically the result of the linearization process.

Step 310 discards a RSSI and EVM pair that are inherently erroneous. The measurements of RSSI and EVM will be most reliable during high signal-to-noise ratios. Represented in FIG. 7, this occurs when the standard deviation of calibrating the EVM to RSSI is around 0.2 dB, corresponding to an EVM of about 6 dB or greater. Thus, any RSSI and EVM pair where the EVM is less than 6 dB will be discarded. Note that the bursts containing an EVM of less than 6 dB will be discarded without a particular certainty as to why they are below 6 dB. It is common that the 6 dB threshold will be exceeded. This will occur most of the time during an active call and during the monitoring of a broadcast control channel. In addition, short bursts, such as those providing minimal information during periods of voice inactivity, should also be excluded.

The difference is then taken in Step 312, and represents the calibration of the mean of RSSI and EVM for one burst, or CAL__now, in units of dB. This is referred to as a calibration because RSSI is being calibrated to approximate the EVM by removing the fixed offset due to the noise floor, and then the difference is taken.

In step 314, the values of CAL__now for each burst are averaged over a period of time to generate the long term noise floor power level, or the long term calibration of the mean of RSSI and EVM, CAL__m__lt. An estimate of the standard deviation of long term noise floor power level, or CAL__stdev__lt is also generated. These values do not contain interference.

The averaging can be accomplished using filters. The averaging, or filtering, has the effect of mitigating the impact of fading and other rapidly occurring phenomena. For example, a recursive filter having a time constant of about 50 bursts can be used to get a short term average of the calibration of the mean, CAL__m__st, and the corresponding standard deviation, CAL__stdev__st. The output of the filter will be the average of 50 bursts where the EVM exceeds 6 dB. An input standard deviation of 0.5 dB will output a standard deviation of less than 0.1 dB. Another recursive filter having a time constant of about four bursts then takes samples of the output of the first filter. The result is an average of over 200 bursts with a standard deviation of less than 0.05 dB. The output is long term noise floor power level or CAL__m__lt. Alternatively, a single recursive filter with a time constant of about 200 bursts could be used to determine CAL__m__lt.

Note that 200 observations of the broadcast control channel where the 6 dB threshold has been exceeded means about one minute of observation. If the paging channels (PCH) are active and parameter estimation is running smoothly, this could take longer than a minute, e.g., 10 minutes. Once Cal_m_lt is generated, it is stored, along with the channel and timeslots used to generate it, for comparison as described below.

The recursive filters are any recursive filters known to those skilled in the art. The present invention is not limited to using recursive filters having a time constant of 4, 50, or 200. For example, FIR filters would be sufficient. These time constants are illustrative of recursive filters that could generate an accurate value of the long term noise floor power level. The use of the estimates of the values for RSSI and EVM should depend on their accuracy. This accuracy could be defined by either a number of samples or by the variance of the estimate. Using variances may be problematic as intermittent interference could be their cause. It is preferable to average over a number of samples as shown above. The following is a pseudo-code to estimate the mean and variance.

```
k=0.99, say
Omk=1−k
/* As each burst is received, e.g., TCH */
GET evm and rssi
IF (EVM>6 db, say) THEN
    CAL__now=rssi-evm
    Number__of__samples=Number__of__samples+1
    CAL__m__st=k*CAL__m__st+omk*CAL__now
```

CAL_var_st=k*CAL_var_st+omk*
  (CAL_now-CAL_m_st)$^2$
END IF

Included in the generation of the long term noise floor power level is a mechanism for excluding interference 316. Once a long term noise floor power level or the long term calibration of the mean of RSSI and EVM has been determined and stored as shown above, a new long term noise floor power level is generated, called CAL_tent, by repeating step 302 through step 314. The value of CAL_tent is compared to the stored value of CAL_m_lt.

A decision must be made whether to replace CAL_m_lt with CAL_tent. This decision depends on the age of the CAL_m_lt and the level of CAL_tent. If CAL_m_lt is old, then the threshold at which CAL_tent might be used should be raised. This process results in a stored CAL_m_lt or long term noise floor power level that does not contain interference for a particular communications link. The following pseudo-code will replace CAL_m_lt if CAL_tent is lower for the first 100 minutes of observations. Following that, the threshold for replacement rises at a rate of 1 dB per 100 minutes. Note that the low values of CAL_m_lt are selected without regard as to why they are low.

Sample 200 bursts, and generate CAL_tent and CAL_var_tent
IF (CAL_var_tent<thres_var) THEN /* ensuring confidence in value */
  /* Calculate the threshold for accepting the new value */
  IF (CAL_age<100 minutes) THEN
    CAL_thres=CAL_m_lt
  ELSE
    CAL_thres=CAL_m_lt +(CAL_age−100)*0.01/*
      all times in minutes */
  END IF
  /* Consider a substitution */
  IF (CAL_tent<CAL_thres) THEN
    CAL_m_lt=CAL_tent
    CAL_age=0
  END IF
CAL_age=CAL_age+1

The system will continue repeating step 302 through 314 so that the most accurate estimation of the long term noise floor power can be obtained. The long term noise floor power level without interference is recorded, as well as the channel used to determine it.
Find the Short Term Noise Floor Power Level Referring back to FIG. 2, the step 204 of generating the short term noise floor power level of a current communication using the communication link is represented by the short term Calibration of the mean (current CAL_m_st) and is further developed in FIG. 4.

Figure 4:
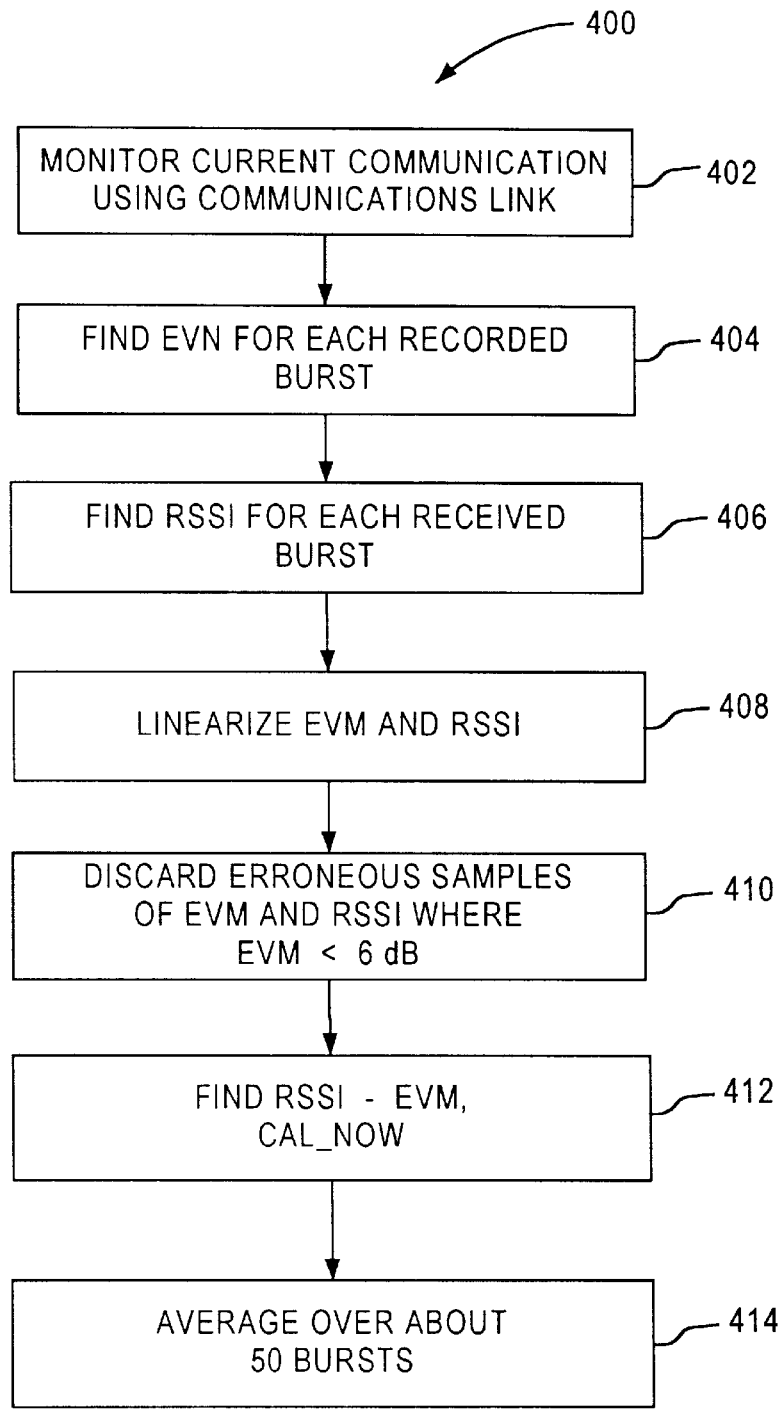
FIG. 4 is a flowchart of a process for generating a value of a short term noise floor power level, CAL_m_st, such as may be used in the mobile communications system of FIG. 1, in combination with the process of FIG. 2.

Referring to FIG. 4, to generate CAL_m_st and CAL_stdev_st, it is necessary to monitor a current communication using the communication link 402. Step 404 determines the EVM for each received burst. Step 406 determines the RSSI for each received burst. Step 408 linearizes the values of EVM and RSSI. Step 410 discards erroneous samples of the EVM and the RSSI, where the EVM is less than 6 dB. The difference between RSSI and EVM is taken in step 412. Finally, step 414 averages this difference over about 50 bursts.

The calculation is very similar to the calculation of CAL_m_lt and CAL_stdev_lt described above, except that a current communication using a traffic channel (TCH) is monitored 402, not a broadcast control channel. Similar to the approach used in association with FIG. 3, the EVM and RSSI for each received burst is determined, 404 and 406, using the same formulas long term noise floor power level of the communications link and the short term noise floor power level of a current communication. The difference is represented by the interference-plus-noise-to-noise ratio (INR). Assuming a constant noise level in the communications link, a significant change in the long term value of the base noise floor power level should be the result of an interference in the communications link.

The INR is then compared to a threshold supplied by the gateway station 208. In step 210, if the INR exceeds the threshold, then an interference detected message is sent to the gateway station. Alternatively, the message won't be transmitted until at least 100 bursts have entered the filter. This allows a second short term noise floor power level to be determined and compared to the long term noise floor level to create another level of accuracy. The message can be sent to the gateway station using a fast associated control channel (FACCH) or similar channel. If the INR is not greater than the threshold in step 208, then step 212 begins again with step 204 to determine another short term noise floor power level of the current communication.

In one embodiment, an interference detected message is sent, then the gateway station will make a decision of whether or not to the communications terminal to other resources such as another communications link or another gateway station. The is accomplished by terminating the existing communications link and reestablishing another communications link to another resource. When a number of calls using the same resource consistently indicate an interference, that resource is marked as questionable, and subsequent allocations avoid using that resource. described above. The values are then converted to dB values and linearized across a range of signal-to-noise ratios of −20 to +20 dB using the formulas and algorithm described above 408. Samples obtained with an EVM less than 6 dB are again discarded to ensure an accurate measurement 410. The difference between RSSI and EVM, CAL_now, for each burst is taken 412. Then the samples of the CAL_now are then averaged using a recursive filter having a time constant of about 50 samples 414. 50 samples taken while monitoring a traffic channel (TCH) can be done in less than 2 seconds. Again, this translates to a standard deviation of less than 0.2 dB. The result is an estimate of the short term noise floor power level of the current communication or the short term Calibration of the mean-of RSSI and EVM and a standard deviation of the calibration of the mean of RSSI and EVM, CAL_m_st and CAL_stdev_st.

Figure 10:
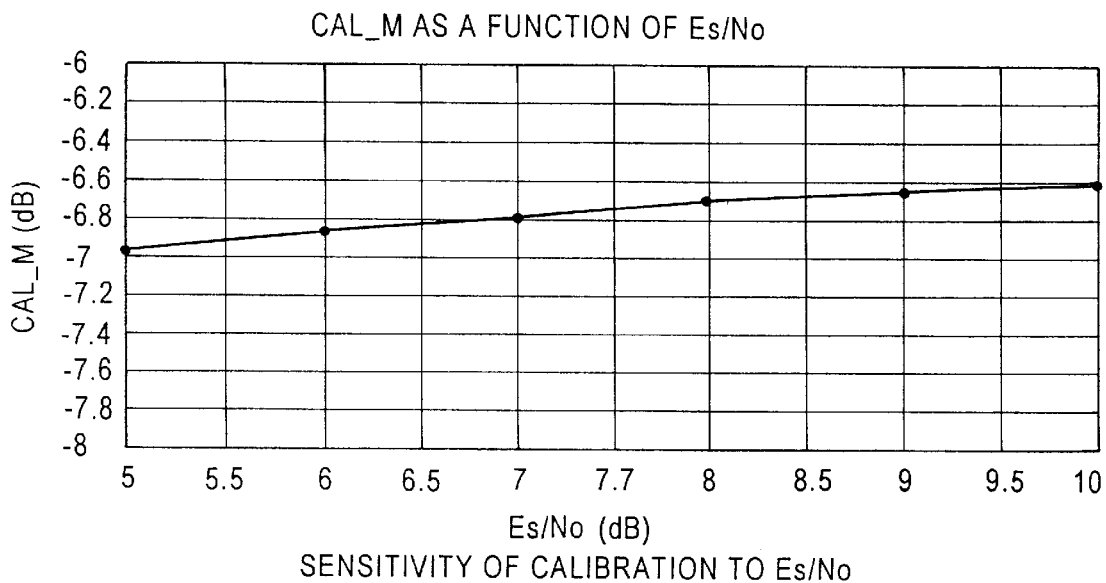
FIG. 10 is a graph of sensitivity of the calibration of the mean of FIG. 8 to different Signal-to-Noise Ratios.

In one embodiment, the value of CAL_m_st may be adjusted to account for minor changes in the sensitivity of EVM over a range of signal-to-noise ratios. Referring to FIG. 10, a graph is shown which indicates the sensitivity of CAL_m_st over a range of signal-to-noise ratios. This sensitivity is accounted for by slightly adjusting the value of CAL_m_st. A linear adjustment such as the following would suffice:
  CAL_m_st=CAL_m_st_unadjusted+K*EVM where K is a constant determined at the receiver.
Interference Detection Referring back to FIG. 2, once the long term noise floor power level of the communication link and the short term noise floor power level of a current communication are determined as in steps 202 and 204, interference is determined in step 206. The interference is determined by taking the difference between the stored Referring to FIG. 5, a block diagram is shown for an interference detection system 500 or an interference detector 500. The inputs, EVM 512 and RSSI 516 are coupled to block 502 that linearizes the inputs, takes the difference, and selects samples. The output of block 502, CAL_now 518, is coupled to the short term filter 504. The outputs of the short term filter, CAL_m_st 520 and CAL_stdev_st 522, are coupled to the long term filter 506 and block 512 for averaging to create a report containing the metrics 528: CAL_m(n), CAL_stdev(n), and INR(n). The output of the long term filter 506, CAL_m_lt 524, is coupled to block 512 and block 508 for generating INR. The output of block 508 is coupled to block 510 to compare INR with an input threshold 526. The output of block 510 generates an interference message detected message 530.

The inputs to the system 514 and 516 are the generated error vector magnitudes (EVM) and received signal strength indications (RSSI) for each received burst that have been converted to dB. Refer to FIG. 2 through FIG. 4 for the details of determining the EVM and the RSSI. These values are input into block 502 which linearizes the values over a range of signal-to-noise ratios and finds the difference between the EVM and the RSSI, CAL_now 518. Block 502 also includes a mechanism to discard samples that are apparently erroneous to obtain accurate results where the EVM is less than 6 dB, as discussed above with reference to FIG. 2 through FIG. 4.

The output of block 502, CAL_now 518, is coupled to a short term filter 504, a recursive filter having a time constant of 50, so that 50 samples or bursts will be averaged. It is not necessary that the time constant is 50 samples, but is a value that will allow for a filtered output with low standard deviation within a short period of time. In this embodiment, the filtered output has a standard deviation of less than 0.1 dB (see FIG. 4 and accompanying text) and is generated within 2 seconds of monitoring a current communication on a traffic channel (TCH) using the communications link.

The outputs of short term filter 504 are the average of the calibration of the mean for 50 bursts and its standard deviation, CAL_m_st 520 and CAL_stdev_st 522. CAL_m_st corresponds to the short term noise floor power level if the system is monitoring a current communication. The outputs of the short term filter 504, CAL_m_st 520 and CAL_stdev_st 522, are coupled to block 512 for averaging and CAL_m_st 520 is coupled to block 508 to find INR. The outputs of short term filter 504, CAL_m_st 520 and CAL_stdev_st 522, are coupled to the input of the long term filter 506 if a broadcast control channel or similar channel is being monitored.

The long term filter 506 is a recursive filter, including a memory function and having a time constant of, for example, 4 samples or bursts. The long term filter 506 averages the output of 4 samples of the short term filter 504, so that the output, CAL_m_lt 524, is an average of over 200 bursts from the received signal. The long term filter 506 is used when determining the long term noise floor power level, CAL_m_lt 524. CAL_m_lt 524 is stored and a new calibration is performed on the next 200 observations, called CAL_tent, as shown above in FIG. 3. As time progresses, the output of the long term filter 506 will be the long term noise floor power level without interference. The output of long term filter 506 is coupled to block 508 to detect interference.

The Interference-plus-Noise-to-Noise Ratio (INR) is determined as the difference between the previously determined and stored CAL_m_lt 524 and CAL_m_st 520. The INR is then compared to a threshold 526 in block 510. If the threshold 526 is exceeded, an interference detected message 530 is transmitted or sent to the gateway station using a fast associated control channel (FACCH).

Once the long term noise floor power level has been determined and is stored in the long term filter 506, an interference can be detected within a couple seconds of usage of the communications link. The gateway station will be able to make decisions in immediate response to an interference having been detected. Additionally, the interference has been quantified in the power domain. This enables the system to more accurately determine the probable source of the interference. Contrast the present invention with a traditional interference detection method that merely observes anomalous behavior in a communications link over an extended period of time and does not provide the ability to measure an interference.

In another embodiment of the invention, the outputs of the short term filter 504 and the long term filter 506 are coupled to block 512 for averaging to generate a report. The objective of the report is to provide an average over the entire period a channel is used, or shorter periods corresponding to the reporting interval. The averaging translates the short term filtered values of CAL_m_st 520 and CAL_stdev_st 522 into the CAL_m(n) and CAL_stdev(n) average over the usage of the channel. Using CAL_m_lt 524, the INR(n) over the usage of the channel is also reported. For example, a 20 minute call on a single traffic channel (TCH-3) should end in a report describing the metrics 528, including CAL_m(n), CAL_stdev(n) and INR(n), over the entire 20 minutes as well as the channel corresponding to the measurements. The reporting period may also be the period between reports. The report generated becomes part of the airtime usage records (AUR).

The following mechanism is an example of generating an average over the period of utilization of a channel, used by block 512. An array is filled with samples, then the contents are averaged and the result is stored in half of the array. Following this, the remainder is filled again with a slower sampling after which averaging occurs again. The recursion gets slower and slower as the period of use of the channel increases.

For example, samples of the output of the short term filter 504 are taken once every 50 bursts. These values are entered into an array having 8 locations until all 8 locations are filled. Typically this will take about 16 seconds. Once the array is full, the contents of the first and fifth location are averaged, with the result placed in the first location. The same is done for the second and sixth, the third and seventh, and the fourth and eighth locations. Samples are then taken from the output of the short term filter 504 at the same rate (one every 50 bursts); however, two samples are averaged, using a recursive filter with a time constant of 2, and then entered into the fifth location. Similarly, the array is filled through the eighth location over the next 16 seconds. The same process of averaging the first and fifth locations, etc. then refills the first four locations. Next the averaging before providing an entry to location 5 then uses a recursive filter with a time constant of 4. The process continues until the end of the usage of the channel. At that time, the valid elements of the array are averaged to generate an overall average. These averages of the short term calibration of the mean (CAL_m(n)), CAL_stdev(n), and INR are stored in a report, or sent to the gateway station in a message from the communications terminal. The averaging report also records the channel and the timeslots used in the communications link.

Figure 5:
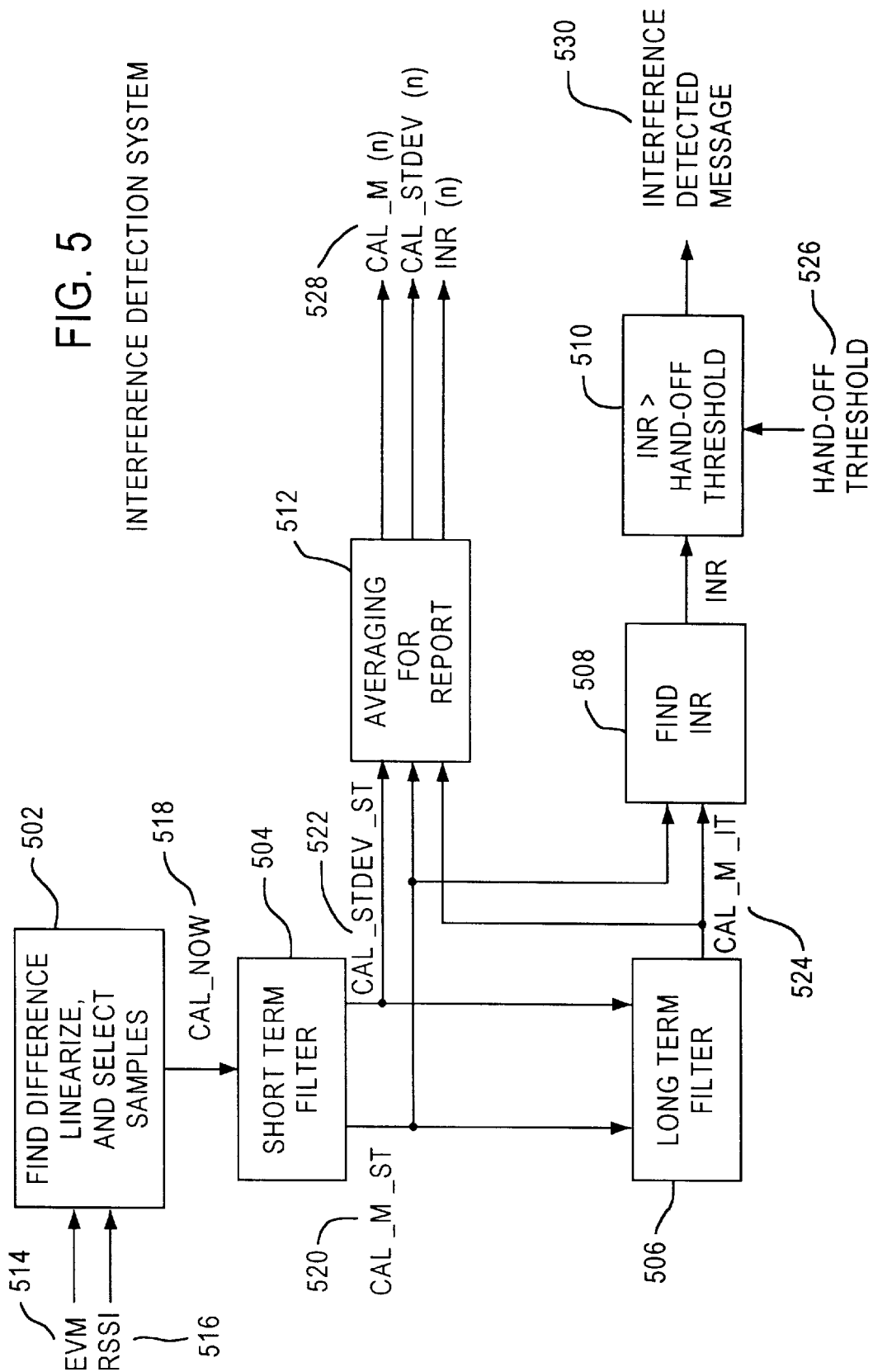
FIG. 5 is a block diagram of an interference detection system suitable for use in the mobile communications system of FIG. 1, for carrying out the processes of FIGS. 2, 3 and 4.

The function blocks of FIG. 5 as shown are broken up separately, but all are capable of being implemented on a single microprocessor designed for such a system. The determination of the inputs EVM 514 and RSSI 516 are also performed on the microprocessor. The design of a microprocessor to accomplish the given tasks is within the knowledge of the skilled artist.

Figure 6:
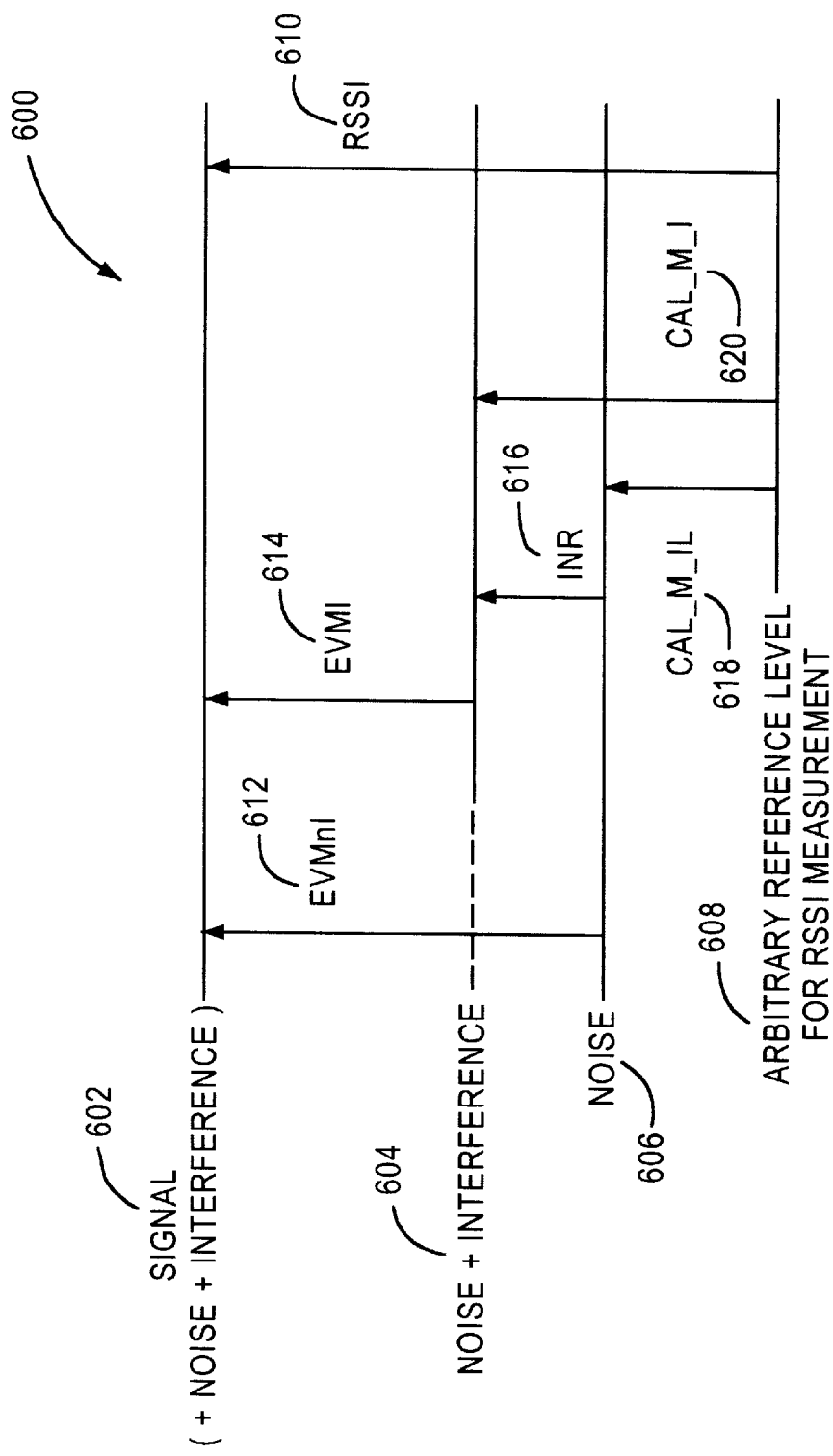
FIG. 6 is a diagram representing a relationship between variables involved in the processes of FIGS. 2, 3 and 4.

Referring next to FIG. 6, a diagram 600 is shown demonstrating the relationships used as a basis of interference detection. Understanding the relationship between the variables used will assist in the understanding of the present invention. The diagram 600 includes a signal+noise+interference reference line 602, a noise reference line 606, a noise+interference reference line 604, and a arbitrary reference level for received signal strength indication (RSSI) measurement 608. Also shown are a received signal strength indication 610 (RSSI), a calibration of the mean with no interference 618 (CAL m__ni), a short term calibration of the mean with interference 620 (CAL__m__i), an error vector magnitude with no interference 612 (EVMni), an error vector magnitude with interference 614 (EVMi), and an interference 616 (INR).

The power level of the Signal-to-Noise Ratio is represented by the error vector magnitude taken with no interference 612 (EVMni) and with interference 614 (EVMi). The noise reference line 606 is the long term noise floor power level without interference represented by the Calibration of the mean with no interference 618 (CAL__m__ni). CAL__m__ni 618 is determined by taking the difference between the RSSI 610 and EVMni 612. The noise plus interference reference line 604 is analogous to the short term noise floor power level (if an interference is present) and is represented by the Calibration of the mean with interference 620 (CAL__m__i). CAL__m__i 620 is determined by taking the difference between RSSI 610 and EVMi 614. The amount of interference detected is represented by the INR 616, and is determined by taking the difference between CAL__m__i 620 and CAL__m__ni 618. Since the measurements of RSSI 610, EVMni 612, and EVMi 614 are in dB, these variables will change at the same rate relative to each other. Thus, the system is unaffected by changes in transmit power levels, shadowing, or fading. The arbitrary reference level for RSSI measurement 608 is set by the communications terminal. Thus, the present invention uses the relationships above to quantify an interference.

Referring the FIG. 7, a graph 700 of the mean and standard deviation of the estimates of error vector magnitude (EVM) and received signal strength indications (RSSI) over a range of signal to noise ratios is shown. The graph 700 illustrates the importance of the 6 dB cutoff 702 for sampling that is described in the previous Figures. Note that for a signal to noise ratio below the 6 dB cutoff 702, the error vector magnitude and the received signal strength indications are not reliable, as evidenced by their standard deviations. Above the 6 dB cutoff 702, the standard deviation is very low, indicating reliable measurements of the received signal strength indication and the error vector magnitude. The standard deviation for the difference the received signal strength indication and the error vector magnitude is around 0.2 dB. Thus, samples are excluded where the measured error vector magnitude is below 6 dB.

Evaluation of Expected Performance

Figure 8:
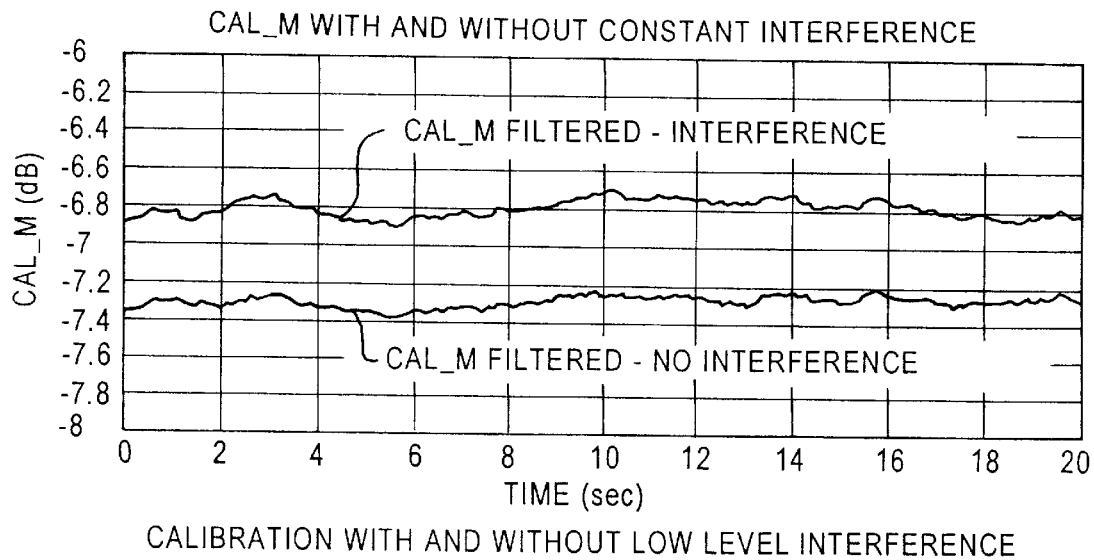
FIG. 8 is a graph of calibration of the mean of FIG. 7 with and without interference over time.
Figure 9:
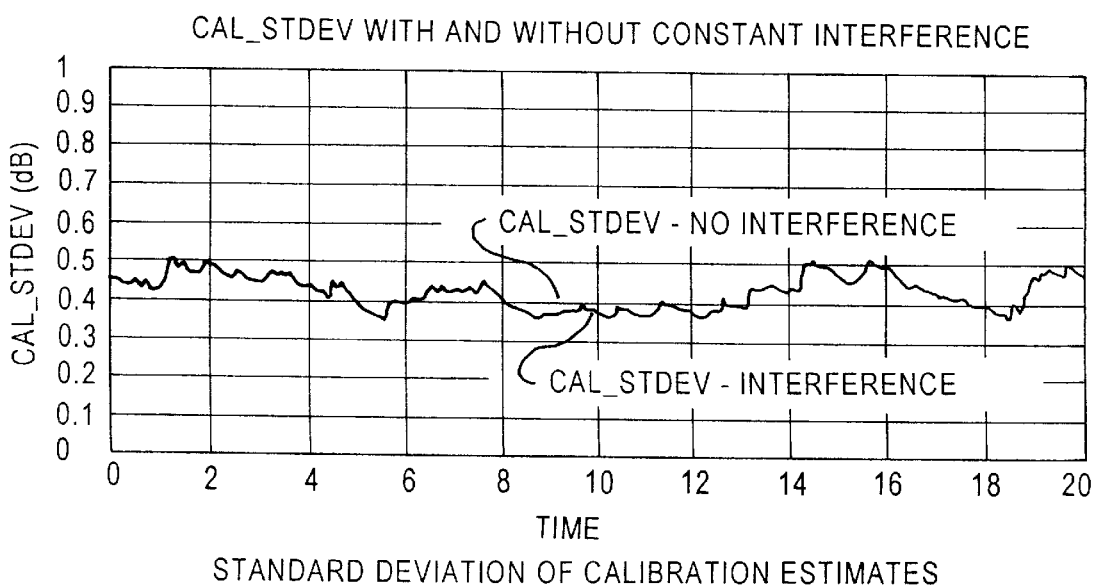
FIG. 9 is a graph of the standard deviation of the calibration of the mean of FIG. 8 with and without interference.

Referring next to FIG. 8 and FIG. 9, a graph is shown indicating the performance of a model of the system using interference detection. A signal is transmitted via a fading channel to a receiver. At the receiver's input, noise, interference and the signal are summed. The purpose is to test the system to see if it is sensitive to the parameters it is not supposed to be sensitive to. The interference used is a sinusoid with a 2 kHz offset from the center frequency of the carrier. For this example the fading channel is not used.

The interference used is 9 dB below the noise level as seen by the receiver's matched filter. This provides a 0.51 dB rise in the noise floor (if interference and noise power are assumed to be equal). The receiver samples and compares the EVM and RSSI on each burst, yielding a calibration estimate. The algorithm described above is used with a gain coefficient of 0.02 and an EVM threshold of 5 dB (as opposed to 6 dB) for each sample. FIG. 8 and FIG. 9 illustrate the CAL__m and CAL__stdev values as a function of time at the outputs of the filters. The following parameters were also used. The Signal-to-Noise Ratio is 7 dB, the Rician coefficient K is 9 dB, and the Doppler Frequency is 10 Hz.

In FIG. 8, the values of CAL__m differ on average by about 0.48 dB, which is very close to the expected value of 0.51 dB. The difference between the standard deviations is about 0.06 dB, show in FIG. 9. Thus, a difference in the noise floor of 0.5 dB can be identified with reliability.

Referring to FIG. 10, the sensitivity of the calibration value to different Signal-to-Noise Ratios is shown. Over a 5 dB range, the total change in the calibration of the mean is 0.4 dB. This difference could be significant depending on the application. Note that the receiver could be aware of the Signal-to-Noise Ratio through the EVM metrics and could compensate for this sensitivity. In an attempt to lessen the sensitivity of the calibration of the mean to the signal-to-noise ratio, the measured CAL__m could be offset by a coefficient determined to level this graph out. This could be accomplished using the formula:

$$CAL\_m = CAL\_m\_\text{unadjusted} + K^* \, EVM$$

where K is the predetermined constant that accounts for this sensitivity.

Figure 11:
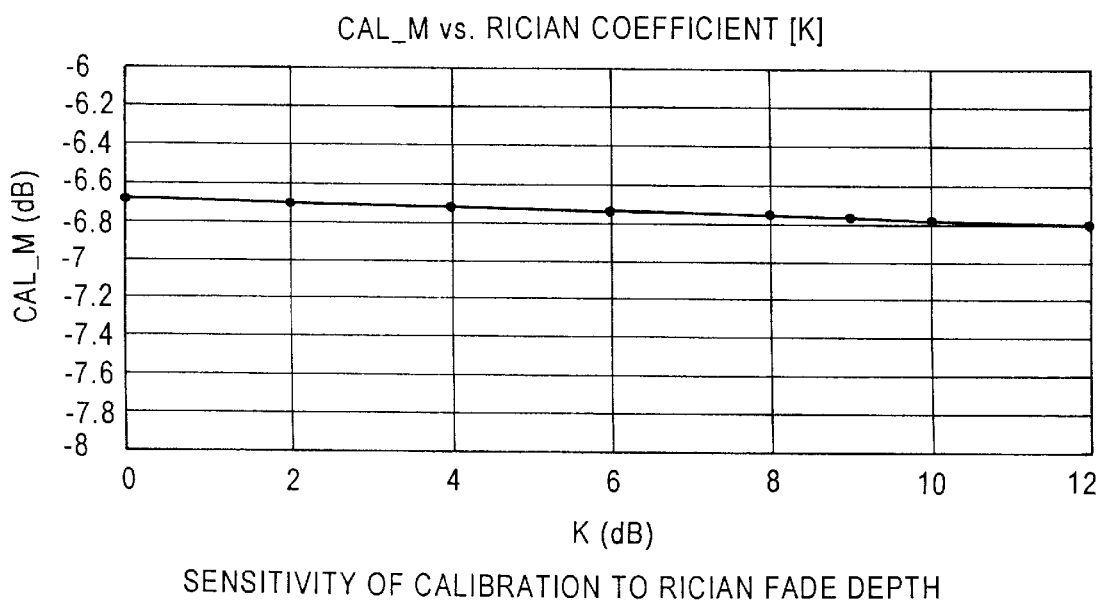
FIG. 11 is a graph of the sensitivity of the calibration of the mean of FIG. 8 as a function of a Rician coefficient K.

Referring next to FIG. 11, the sensitivity of the calibration of the mean is tested as a function of the Rician coefficient K. As shown, the calibration of the mean changed about 0.15 dB over a range of 0 to 12 dB.

Figure 12:
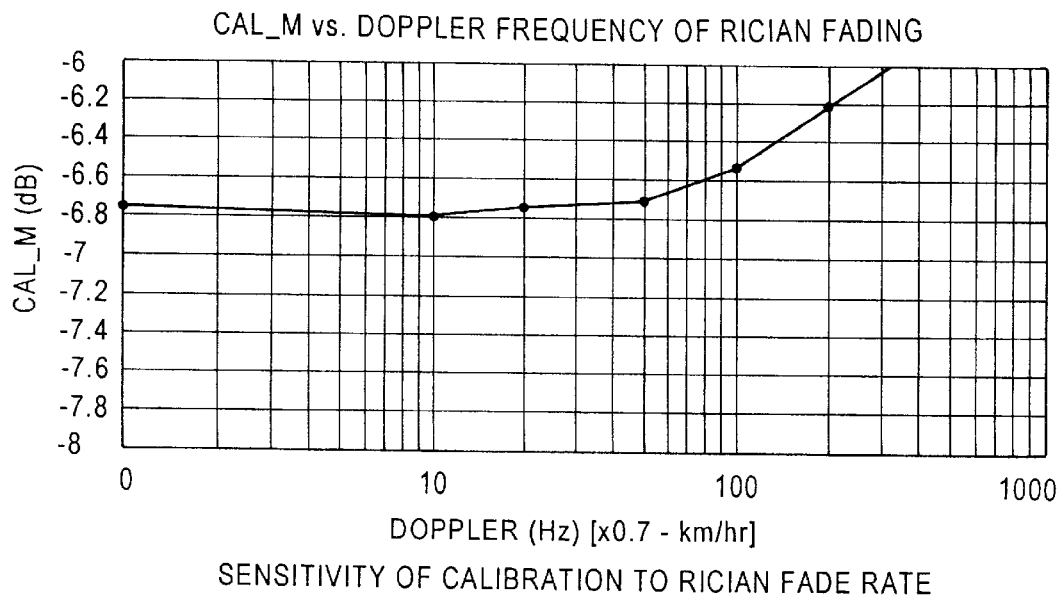
FIG. 12 is a graph of the sensitivity of the calibration of the mean of FIG. 8 as a function of Doppler frequency of Rician fading.

Referring next to FIG. 12, the sensitivity of the calibration of the mean is tested as a function of the Doppler frequency of Rician fading. As the fading increases, the demodulator's ability to track phase degrades. This results in a rise in sensitivity for Doppler frequencies above 50 Hz. Above 100 Hz, the error exceeds 0.2 dB.

Figure 13:
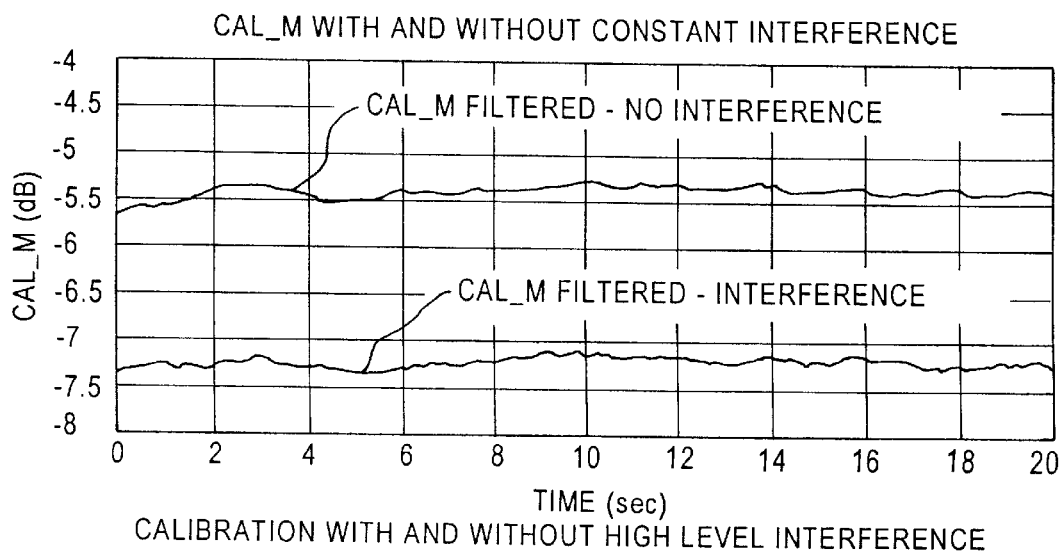
FIG. 13 is a graph of the calibration of the mean of FIG. 8 with and without a high level interference.
Figure 14:
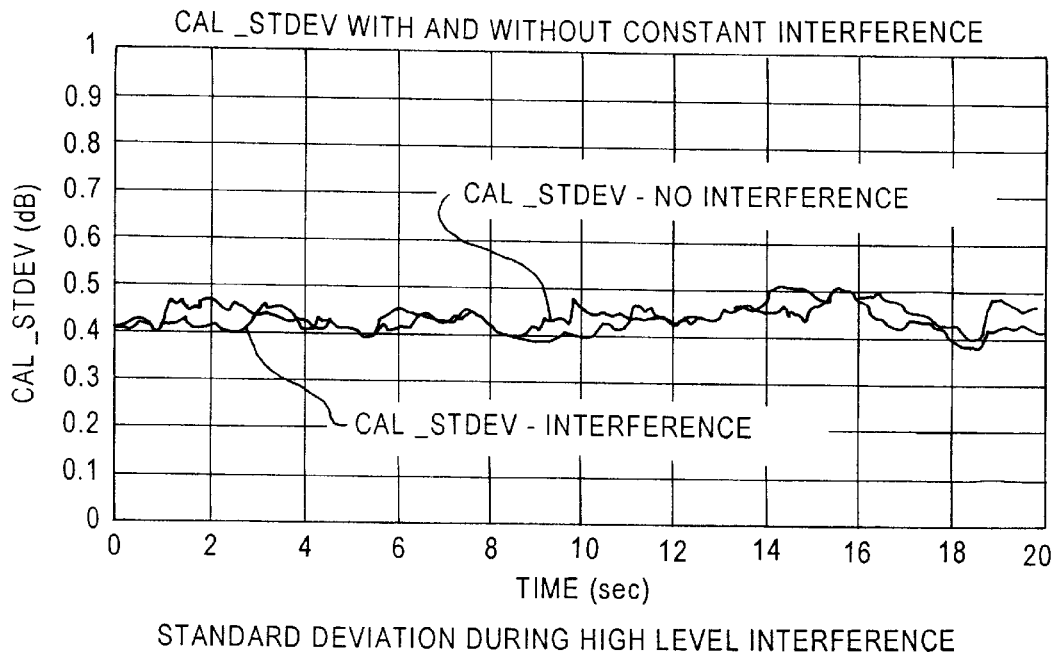
FIG. 14 is a graph of the standard deviation of the calibration of the mean of FIG. 8 with and without a high level interference

Referring next to FIG. 13 and FIG. 14, graphs are shown for the calibration of the mean and the standard deviation with and without the presence of a high level interference.

Figure 15:
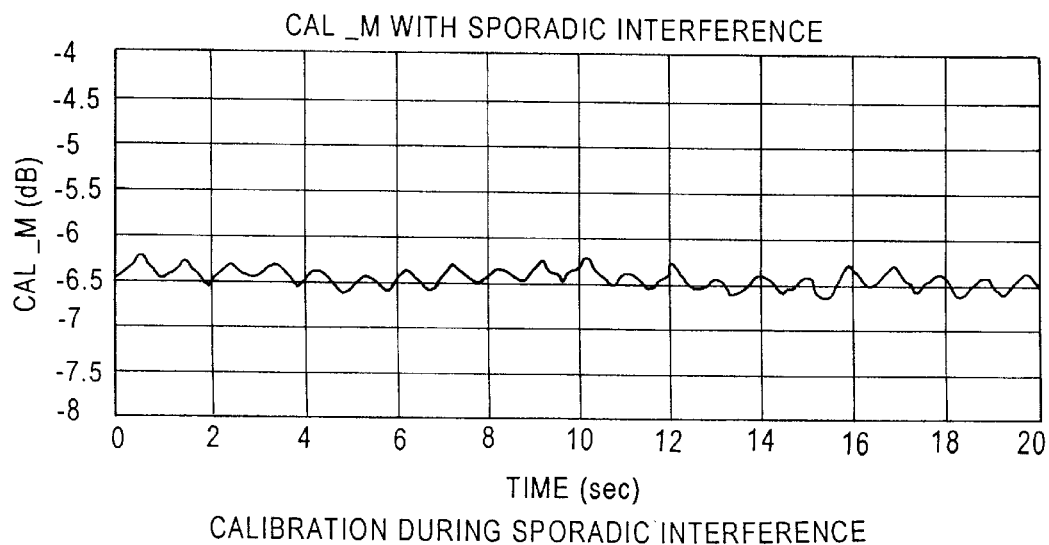
FIG. 15 is a graph of the calibration of the mean of FIG. 8 during sporadic interference.

Referring next to FIG. 15 and FIG. 16, graphs are shown for the calibration of the mean and the standard deviation with a sporadic interference present.

Referring next to FIG. 17, a graph is shown for the relationship between the standard deviation of the calibration of the mean and the frequency of the presence of a sporadic interference.

While the invention herein disclosed has been described by means of specific embodiments and applications thereof, numerous modifications and variations could be made thereto by those skilled in the art without departing from the scope of the invention set forth in the claims.

What is claimed is:

1. A method of detecting interference at a first communications terminal comprising:

establishing a communications link between the first communications terminal and a second communications terminal;

monitoring a noise floor of the communications link over time, the noise floor representing a base level of noise present in the communications link;

calculating a long term noise floor power level without interference in response to the monitoring of the noise floor of the communications link over time;

monitoring a noise floor of a current communication through the communications link, representing a current level of noise present on the communications link;

calculating a short term noise floor power level in response to the monitoring of the noise floor of the current communication through the communications link; and comparing the short term noise floor power level with the long term noise floor power level without interference.

2. The method of claim 1 further comprising determining an interference level in response to said comparing.

3. The method of claim 2 further comprising comparing said interference level to a threshold.

4. The method of claim 2 wherein said determining comprises said determining said interference level measured in dB in response to said comparing.

5. The method of claim 1 wherein said establishing comprises establishing a communications link between said first communications terminal and said second communications terminal via a satellite.

6. The method of claim 1 wherein said calculating a long term noise floor power level without interference includes:

generating an error vector magnitude from each of a plurality of bursts received from said communications link;

generating a received signal strength indication from each of the plurality of bursts received from said communications link;

linearizing the error vector magnitude and the received signal strength indication from each of the plurality of bursts;

defining a sample as the difference between the received signal strength indication and the error vector magnitude from each of the plurality of bursts; and averaging a plurality of samples taken over a period of time, excluding one or more of the plurality of samples where the error vector magnitude of one or more of the plurality of samples is less than 6 dB.

7. The method of claim 6 wherein said averaging said plurality of samples further comprises averaging said plurality of samples taken over about 200 bursts, excluding one or more of said plurality of samples where said error vector magnitude is less than 6 dB.

8. The method of claim 6 wherein said calculating a short term noise floor power level in response to said monitoring of said noise floor of said current communication through said communications link includes:

generating said error vector magnitude from each of a plurality of current bursts received from said current communication through said communications link;

generating said received signal strength indication from each of the plurality of current bursts received from said current communication through said communications link;

linearizing said error vector magnitude and said received signal strength indication for each of the plurality of current bursts;

defining a current sample as the difference between said received signal strength indication and said error vector magnitude from each of the plurality of current bursts; and averaging a plurality of current samples over a short period of time, excluding one or more of the plurality of current samples in the event said error vector magnitude of one of the plurality of current samples is less than 6 dB.

9. The method of claim 8 wherein said averaging said plurality of current samples comprises averaging said plurality of current samples over 50 bursts.

10. The method in claim 8 wherein said generating said error vector magnitude comprises:

generating an average error vector magnitude from each of said plurality of bursts received from said communications link, the average error vector magnitude being defined by a formula:

$$EVM_a = \sqrt{\frac{1}{N}\sum_{n=0}^{N-1} \sigma^2(n)/\mu^2(n)}$$

where $EVM_a$ is the average error vector magnitude, N is a total number of bits in each of said plurality of bursts, $\mu$ is an estimated mean level for each of a plurality of bits, and $\sigma^2$ is an estimated variance in a level for each of the plurality of bits; and converting the average error vector magnitude to said error vector magnitude using a formula:

$$EVM=20*\log_{10}(EVM_a)$$

where EVM is the average error vector magnitude having been converted.

11. The method of claim 8 wherein said generating said received signal strength comprises:

generating an average received signal strength indication from each of said plurality of bursts received from said communications link, the average received signal strength being defined by a formula:

$$RSSI_a = \frac{1}{N}\sum_{n=0}^{N-1} \mu^2(n)$$

where $RSSI_a$ is the average received signal strength indication, N is a total number of bits in each of said plurality of bursts, and $\mu$ is an estimated mean level for each of a plurality of bits; and converting the average received signal strength indication to said received signal strength indication using a formula:

$$RSSI=10*\log_{10}(RSSI_a)+AGC$$

where RSSI is the received signal strength indication, and AGC is an automatic gain control.

12. The method of claim 1 wherein said establishing comprises establishing said communications link between a communications terminal and a gateway station via a satellite.

13. A method of estimating a noise floor power level of a communications link comprising:

receiving a plurality of bursts from the communications link into a communications terminal;

generating an error vector magnitude from each of the plurality of bursts;

generating a received signal strength indication from each of the plurality of bursts;

linearizing the error vector magnitude and the received signal strength indication from each of the plurality of bursts;

defining a sample as the difference between the received signal strength indication and the error vector magnitude from each of the plurality of bursts; and averaging a plurality of samples taken over a period of time.

14. The method of claim 13 further comprising:

excluding a sample in the event said error vector magnitude is less than 6 dB prior to said averaging.

15. A communications system for detecting interference comprising:

a first communications terminal for transmitting and receiving signals to and from a second communications terminal;

a communications link established between the first communications terminal and the second communications terminal; and an interference detector coupled to the first communications terminal, the interference detector comprising:

means for generating a long term noise floor power level of the communications link without interference;

means for generating a short term noise floor power level of a current communication using the communications link; and means for comparing the long term noise floor power level and the short term noise floor power level to detect an interference.

16. The system of claim 15 wherein said communications link comprises:

a first communications link established between said first communications terminal and a satellite; and a second communications link established between the satellite and said second communications terminal.

* * * * *